US006521870B2

(12) United States Patent
Nolan et al.

(10) Patent No.: US 6,521,870 B2
(45) Date of Patent: Feb. 18, 2003

(54) THERMAL/CONVECTION OVEN INCLUDING HALOGEN LAMPS

(75) Inventors: Kevin Farrelly Nolan, Sheperdsville, KY (US); Todd Vincent Graves, Louisville, KY (US); Don R. Wagner, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/758,516

(22) Filed: Jan. 11, 2001

(65) Prior Publication Data

US 2002/0088790 A1 Jul. 11, 2002

(51) Int. Cl.[7] .................................................. A21B 1/26

(52) U.S. Cl. ........................ 219/400; 219/411; 219/681; 126/21 A

(58) Field of Search ......................... 219/400, 411–414, 219/680, 681, 685

(56) References Cited

U.S. PATENT DOCUMENTS

| | | | | | |
|---|---|---|---|---|---|
| 3,692,968 | A | * | 9/1972 | Yasuoka | 219/681 |
| 3,828,163 | A | * | 8/1974 | Amagami et al. | 219/413 |
| 4,477,706 | A | * | 10/1984 | Mittelsteadt | 219/681 |
| 4,480,164 | A | * | 10/1984 | Dills | 219/681 |
| 4,493,960 | A | * | 1/1985 | Mittelsteadt et al. | 219/681 |
| 4,728,763 | A | | 3/1988 | Bell et al. | |
| 4,761,529 | A | | 8/1988 | Tsisios | |
| 4,771,154 | A | | 9/1988 | Bell et al. | |
| 4,894,518 | A | * | 1/1990 | Ishikawa et al. | 219/413 |
| 5,021,636 | A | | 6/1991 | Bouman | |
| 5,045,671 | A | | 9/1991 | Kanaya et al. | |
| 5,147,993 | A | | 9/1992 | Braun et al. | |
| 5,157,239 | A | | 10/1992 | Kanaya et al. | |
| 5,182,439 | A | * | 1/1993 | Burkett et al. | 219/412 |
| 5,310,979 | A | * | 5/1994 | Jung et al. | 219/680 |
| 5,317,130 | A | * | 5/1994 | Burkett et al. | 219/413 |
| 5,352,865 | A | * | 10/1994 | Burkett et al. | 219/413 |
| 5,416,301 | A | | 5/1995 | Aoshima | |
| 5,517,005 | A | | 5/1996 | Westerberg et al. | |
| 5,721,805 | A | | 2/1998 | Cook et al. | |
| 5,814,794 | A | * | 9/1998 | Lim | 219/685 |
| 5,877,477 | A | * | 3/1999 | Petty et al. | 219/413 |
| 5,919,385 | A | | 7/1999 | Kersten et al. | |
| 5,954,980 | A | * | 9/1999 | Westerberg et al. | 219/411 |
| 5,958,271 | A | | 9/1999 | Westerberg et al. | |
| 5,990,454 | A | | 11/1999 | Westerberg et al. | |
| 5,990,460 | A | | 11/1999 | Petty et al. | |
| 6,005,229 | A | * | 12/1999 | Brown et al. | 219/412 |
| 6,005,235 | A | * | 12/1999 | Shin | 219/681 |
| 6,013,900 | A | | 1/2000 | Westerberg et al. | |
| 6,069,345 | A | | 5/2000 | Westerberg | |
| RE36,724 | E | | 6/2000 | Westerberg et al. | |
| 6,114,664 | A | * | 9/2000 | Cook et al. | 219/400 |
| 6,291,808 | B1 | * | 9/2001 | Brown | 219/681 |
| 6,333,492 | B1 | * | 12/2001 | Graves et al. | 219/413 |
| 2001/0032840 | A1 | * | 10/2001 | Kim et al. | 219/681 |
| 2002/0040902 | A1 | * | 4/2002 | Brown et al. | 219/681 |

FOREIGN PATENT DOCUMENTS

| | | | |
|---|---|---|---|
| GB | 2237487 | * | 5/1991 |

* cited by examiner

*Primary Examiner*—Joseph Pelham
(74) *Attorney, Agent, or Firm*—Armstrong Teasdale LLP

(57) ABSTRACT

The present invention relates to an oven that includes, in an exemplary embodiment, a cooking cavity assembly, a controller, a halogen lamp and fan assembly, and a vent assembly. The halogen lamp and fan assembly, sometimes referred to herein as a convection module, includes one or more halogen lamps and a fan for circulating heat from the lamps into the cooking cavity. The oven can be operated in two modes, namely, thermal emulation and customized cooking. In the thermal emulation mode, the oven is pre-heated to a target temperature by lamps cycling on and off under the control of the controller. Once the target temperature is reached, the user places the food into the cooking cavity and the food is cooked for the same amount of time as in a conventional thermal oven. In the customized cooking mode, food is placed in cooking cavity for the entire cooking cycle, including pre-heat.

16 Claims, 3 Drawing Sheets

THERMAL/CONVECTION OVEN INCLUDING HALOGEN LAMPS

BACKGROUND OF THE INVENTION

This invention relates generally to ovens and, more particularly, to convection cooking utilizing halogen lamps.

In thermal and convection ovens, the food is cooked by the air in the cooking cavity, which is heated by a heat source. The heat source in both thermal and convection ovens may, for example, be a sheath heater. Conventional thermal ovens do not use a fan to circulate the hot air in the cooking cavity. Conventional convection ovens, however, include a fan to increase cooking efficiency by circulating the hot air around the food. Specifically, the moving air in convection ovens provide quicker cooking compared to cooking in thermal ovens because in convection ovens, the air movement displaces the boundary layer of air around the food and replaces it with hot air. As a result, the heat transfer from the hot air to the food is more rapid in convection ovens as compared to thermal ovens. In a thermal oven, the boundary layer of air acts as insulation around the food and slows down the heat transfer necessary for cooking the food.

The heat sources utilized in thermal and convection ovens typically require some period of time to heat up to reach the target the temperature, as well as a period of time to cool down when cooking is to cease. Such thermal characteristics of the heat source result in difficulties in precisely controlling oven operation to achieve the desired cooking. For example, if a particular food is to cook at 450 degrees F. for 20 minutes, the oven typically first must be pre-heated to the target temperature. Such pre-heating operation may require at least a few minutes. In addition, once the oven is pre-heated, the food is placed in the oven and cooking proceeds for a period of time, for example 20 minutes. Unless the food is immediately removed from the oven upon expiration of the 20 minute cooking cycle, and even though the heat source may be turned off and is cooling, the heat source continues to generate heat which cooks the food. Therefore, the food may actually cook for more than 20 minutes if it is left in the oven as the heat source cools down.

BRIEF SUMMARY OF THE INVENTION

In an exemplary embodiment of the invention, an oven includes a cooking cavity assembly, a controller, a halogen lamp and fan assembly, and a vent assembly. The cooking cavity assembly includes, for example, a shell and a cooking cavity is located within shell. The controller, in the exemplary embodiment, includes a programmable micro controller coupled to a display, an injection molded knob or dial, and tactile control buttons. Selections are made by rotating the dial clockwise or counter-clockwise and when the desired selection is displayed, pressing the dial. For example, many cooking algorithms can be prestored in the oven memory for many different types of foods. When a user is cooking a particular food item that corresponds to prestored cooking algorithm, the prestored cooking algorithm is selected by rotating the dial until the selected food name is displayed and then pressing the dial. Instructions and selections are displayed on the liquid crystal display.

The oven further includes a halogen lamp and fan assembly, sometimes referred to herein as a convection module. The convection module includes one or more halogen lamps and a fan for circulating heat from the lamps into the cooking cavity.

The vent assembly is provided to facilitate drawing air into and out of the oven. Also, since the exemplary oven is an over the cooktop type oven, the vent assembly is provided for drawing air away from a cooktop located below oven.

The above described oven can be operated in two modes, namely thermal emulation and customized cooking. In the thermal emulation mode, the oven is pre-heated to a target temperature by lamps cycling on and off under the control of the controller. Once the target temperature is reached, the user places the food into the cooking cavity and the food is cooked for the same amount of time as in a conventional thermal oven. For example, if the package directions for a food direct a user to cook at 350 degrees F. for 10 minutes, the oven is preheated until the cooking cavity temperature reaches 350 degrees. The food is then placed into the cavity for 10 minutes.

The halogen lamps are then cycled on and off by the controller to maintain the temperature in the cooking cavity within a tight tolerance around 350 degrees F. Since halogen lamps have a fast response time, once deenergized, the air in the cooking cavity begins to cool. Therefore, although there is some temperature overshoot, e.g., the cavity temperature may reach a temperature higher than 350 degrees F. for some period of time, the cavity begins to cool and significant adverse effects from such overshoot are avoided. If the temperature in the cooking cavity falls below a tolerance temperature, e.g., 340 degrees F. for a 350 degree F. target temperature, then lamps are once again energized. The cycling continues until the cook time expires.

In the customized cooking mode, food is placed in cooking cavity for the entire cooking cycle, including the pre-heat portion of the cycle. A temperature sensor senses the starting temperature of the cooking cavity and controller determines the pre-heat time required to achieve the target temperature. For example, pizza can be pre-programmed into controller. The controller determines, e.g., from a lookup table of preprogrammed cooking times, that pizza cooks at 375 degrees F. for 12 minutes. The user puts the pizza in the oven cavity, selects pizza on the control, and presses start. Based on the sensed starting temperature, the controller calculates the pre-heat time and the amount of cooking that occurs during preheating, and increments or decrements the 12 minute cooking time accordingly.

The convection module including halogen lamps as described above facilitates maintaining the cooking cavity within a narrow temperature band around a target temperature, which facilitates precise cooking. Specifically, precisely controlling when heat is added to the food provides for tight control on cavity temperature because there is less overshoot of the target temperature.

Just as the use of a convection fan increases the speed of cooking through more rapid heating of the food surface, the use of radiant energy also speeds up the cooking of many foods through increased browning of the food surface. The combination of convection and radiant heating provides significant synergy of these two effects, allowing faster cooking than is possible with a thermal oven.

DETAILED DESCRIPTION OF THE INVENTION

The present invention is directed, in one aspect, to operation of an oven that includes halogen lamps as a heat source for convection cooking. In another aspect, the present invention is directed to operation of an oven that includes halogen lamps and a microwave module. Although specific embodiments of such an oven are described below, it should be understood that many other embodiments are possible and the present invention is not limited to the specific embodiments described herein. For example, the ovens described below are over the range type ovens. The present invention, however, is not limited to practice with just over the range type ovens and can be used with many other types of ovens.

Figure 1:
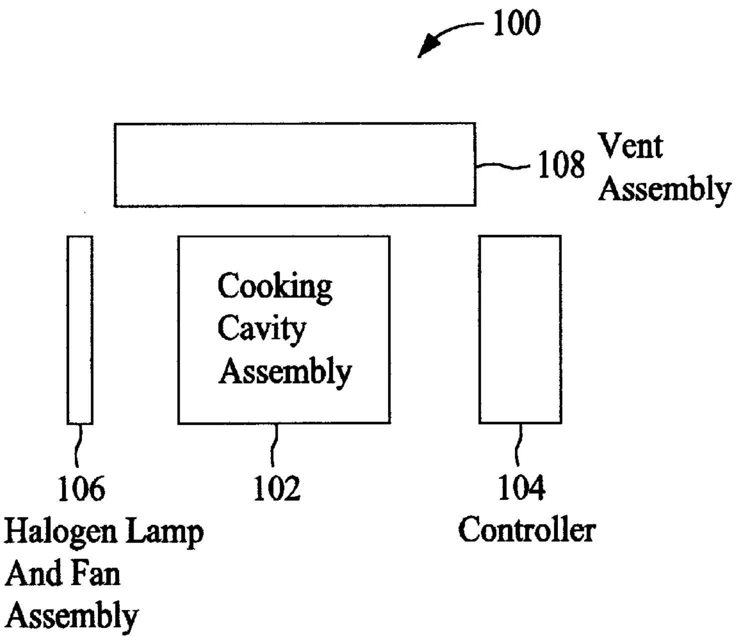
FIG. 1 is a schematic illustration of an oven.

FIG. 1 is a schematic illustration of an oven 100. Oven 100 includes a cooking cavity assembly 102, a controller 104, a halogen lamp and fan assembly 106, and a vent assembly 108. Cooking cavity assembly 102 includes, for example, a shell and a cooking cavity is located within shell. The cooking cavity is constructed using high reflectivity (e.g., 72% reflectivity) stainless steel, and a turntable is located in cavity for locating food. A door is secured to a front of the cavity and within a door frame. A window is provided in the door to allow viewing of food within the cavity.

Controller 104, in the exemplary embodiment, includes a programmable micro controller coupled to a display, an injection molded knob or dial, and tactile control buttons. Selections are made by rotating the dial clockwise or counter-clockwise and when the desired selection is displayed, pressing the dial. For example, many cooking algorithms can be prestored in the oven memory for many different types of foods. When a user is cooking a particular food item that corresponds to prestored cooking algorithm, the prestored cooking algorithm is selected by rotating the dial until the selected food name is displayed and then pressing the dial. Instructions and selections are displayed on the liquid crystal display.

Oven 100 further includes a halogen lamp and fan assembly 106, sometimes referred to herein as a convection module. Assembly 106 includes one or more halogen lamps and a fan for circulating heat from the lamps into the cooking cavity. In an exemplary embodiment, the lamps are rated at 500 W. The convection fan blows air over heaters and into the cooking cavity. The specific halogen cooking lamps can vary from embodiment to embodiment. For example, the specific ratings and number of lamps and/or heaters utilized can vary from embodiment to embodiment. Generally, the combination of lamps is selected to provide the desired cooking characteristics.

Oven 100 also includes a vent assembly 108. Vent assembly 108 is provided to facilitate drawing air into and out of oven 100. Also, since oven 100 is illustrated as an over the cooktop type oven, vent assembly 108 is provided for drawing air away from a cooktop located below oven 100.

Figure 2:
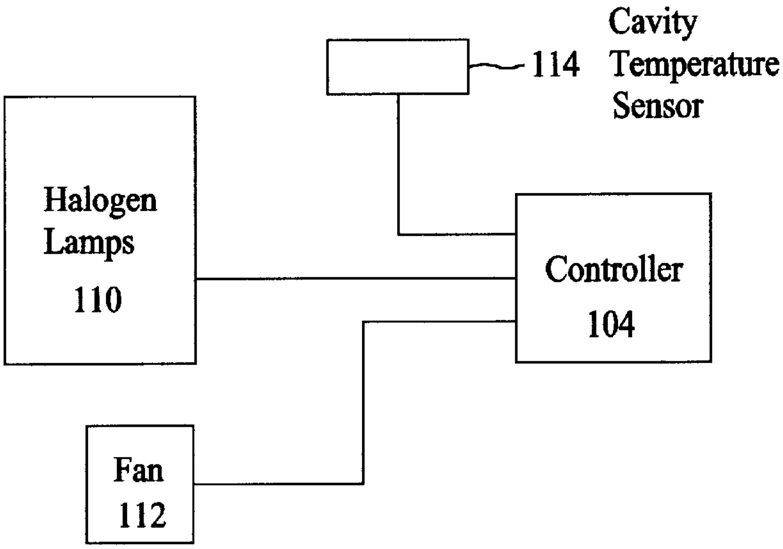
FIG. 2 is a block diagram of oven components.

FIG. 2 is a block diagram of oven components. Specifically, controller 104 is electrically coupled to each halogen lamp 110 as well as to a fan 112. In addition, controller 104 is coupled to a cavity temperature sensor 114, such as a thermistor, which generates an output signal representative of the temperature in the cooking cavity.

During operation, and in a thermal mode of operation, the user selects a target temperature and cooking time via the controller interface. Controller 104 then controls energization of lamps 110 and fan 112 to maintain the target temperature in the cooking cavity for the user selected time. The temperature representative signal from sensor 114 is utilized by controller 104 in maintaining the cavity temperature at the user selected temperature.

For example, if a user desires to cook food at 400 degrees F. for 30 minutes, controller 104 energizes halogen lamps in accordance with a preprogramed duty cycle until the cavity temperature reaches 400 degrees F. Since halogen lamps 110 have a much faster response time than heat sources such as sheath heaters, the air in the cooking cavity reaches the target temperature much faster than if a sheath heater were utilized. Therefore, pre-heat operations can be reduced.

Once the target temperature is reached, halogen lamps 110 are turned off. Again, since halogen lamps have a fast response time, once deenergized, the air in the cooking cavity begins to cool. Therefore, although there is some temperature overshoot, e.g., the cavity temperature may reach a temperature higher than 400 degrees F. for some period of time, the cavity begins to cool and significant adverse effects from such overshoot are avoided.

If the temperature in the cooking cavity falls below a tolerance temperature, e.g., 390 degrees F. for a 400 degree F. target temperature, then lamps 110 are once again energized. The cycling continues until the cook time expires. Once the cook time expires, the cycling of halogen lamps 110 ceases. Even if lamps 110 are on when the end of the cook cycle occurs, and since halogen lamps have a fast response time as described above, the air in the cooking cavity begins to cool at the end of the cook cycle. Therefore, cooking ceases more quickly than with other heat sources such as sheath heaters, which facilitates avoiding the overcooking of food. Although there is some temperature overshoot, e.g., the cavity temperature may reach a temperature higher than 400 degrees F. for some period of time, the cavity begins to cool and significant adverse effects of overcooking can be avoided.

In the customized cooking mode, food is placed in cooking cavity for the entire cooking cycle, including the preheat portion of the cycle. Temperature sensor 114 senses the starting temperature of cooking cavity and micro computer determines the pre-heat time required to achieve the target temperature, the amount of cooking that occurs during preheating, and increments or decrements the cooking time accordingly.

The use of halogen lamps, as described above, facilitates maintaining the cooking cavity within a narrow band of temperature around the target temperature, which enables more precise cooking. Specifically, precisely controlling when heat is added to the food provides for tight control on cavity temperature because there is less overshoot of the target temperature.

Figure 3:
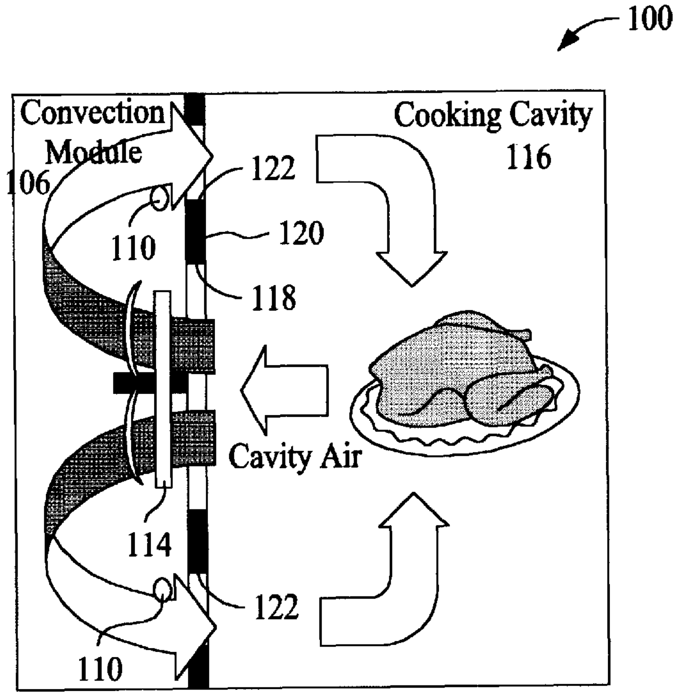
FIG. 3 is a schematic illustration of the oven shown in FIG. 1 in a convection cooking mode.
Figure 4:
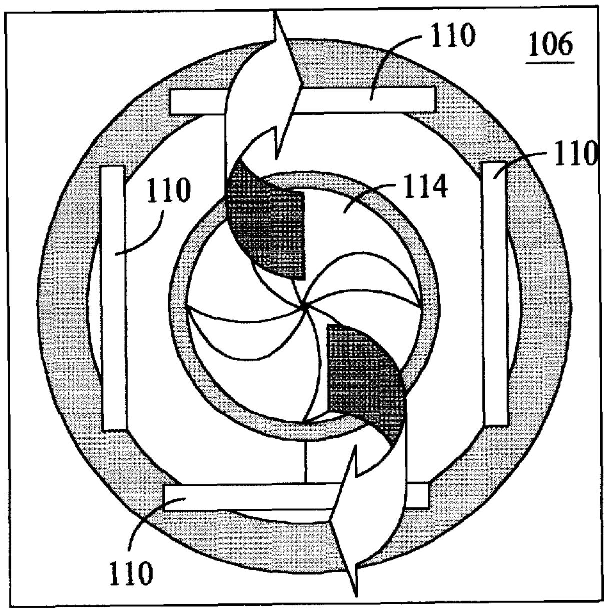
FIG. 4 is a schematic illustration of halogen lamp assembly shown in FIG. 3.

FIG. 3 is a schematic illustration of oven 100 in a convection cooking mode, and FIG. 4 is a schematic illustration of halogen lamp assembly 106. Halogen lamp assembly 106 includes four halogen cooking lamps 110. Of course, more or fewer lamps could be utilized. As shown in FIGS. 3 and 4, when convection fan 114 is energized, air is drawn by fan 114 from cavity 116 through openings 118 in a cavity wall 120. The air is then blown over halogen lamps and back into cavity through openings 122. As the air is blown over lamps, the air is heated, and the hot air flows into cavity 116 and cooks the food.

In addition to providing heat, lamps 110 provide radiant energy into cooking cavity 116. That is, radiant energy from lamps 110 is within a line of sight of the food in cooking cavity 116. Such radiant energy also facilitates cooking food and browning a food surface. Just as the use of a convection fan increases the speed of cooking through more rapid heating of the food surface, the use of radiant energy also speeds up the cooking of many foods through increased browning of the food surface. The combination of convection and radiant heating provides significant synergy of these two effects, allowing faster cooking than is possible with a thermal oven.

Figure 5:
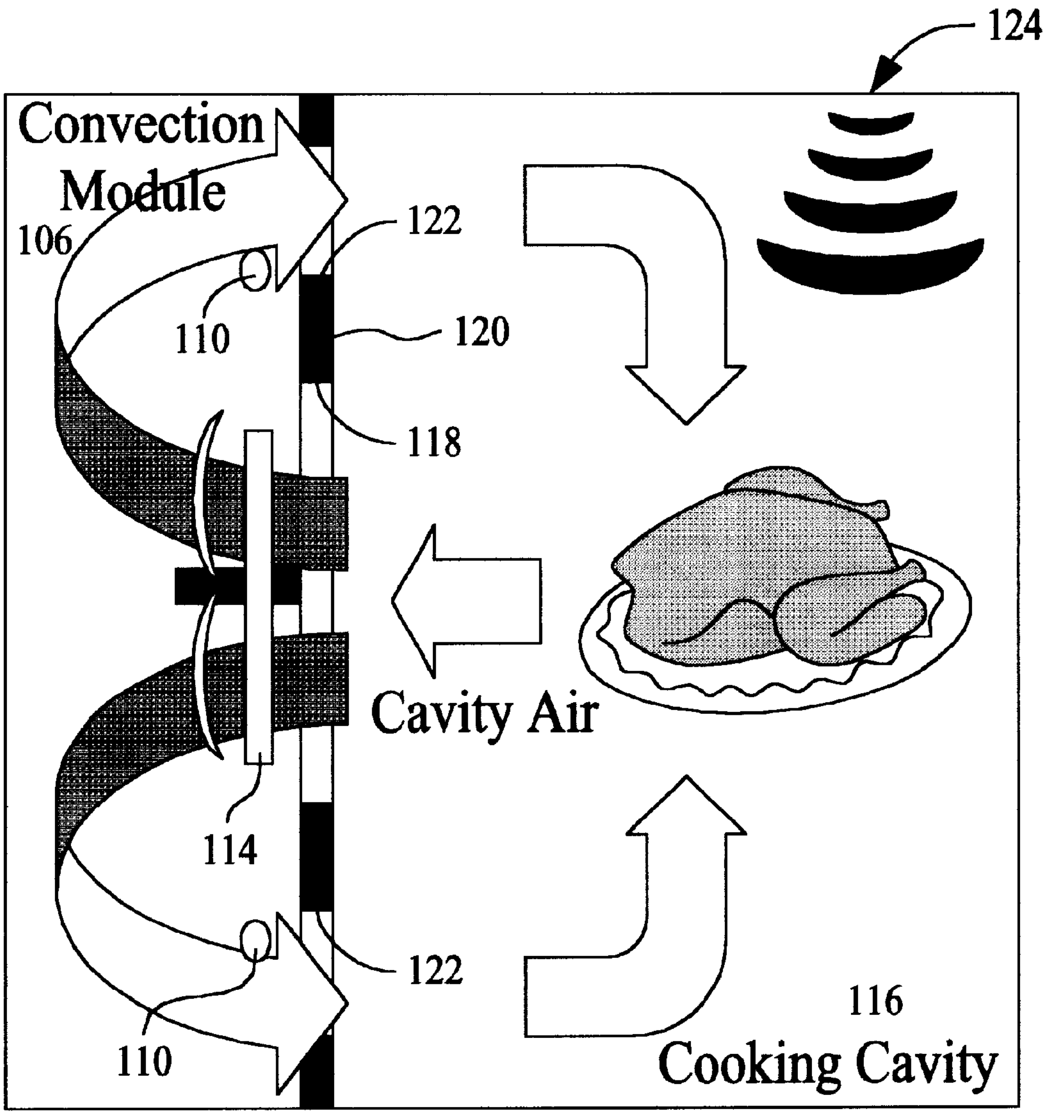
FIG. 5 is a schematic illustration of an oven including a halogen lamp assembly and a microwave assembly.

As explained above, convection module 106 can be utilized in many other ovens and oven types. For example, module 106 can be used in a combination including a microwave module 124, as schematically illustrated in FIG. 5. Microwave module 124 includes an RF generation system, such as those RF generation systems used in known microwave ovens. In such RF generation systems, a magnetron generates microwave energy to cook food by heating the water molecules within the food.

Convection module 106, as described above, includes halogen lamps 110 and convection fan 114. When convection fan 114 is energized, air is drawn by fan 114 from cavity 116 through openings 118 in a cavity wall 120. The air is then blown over halogen lamps 110 and back into cavity 116. As the air is blown over lamps 110, the air is heated, and the hot air flows into cavity 116 and cooks the food. Lamps 110 also provide radiant energy into cooking cavity 116 to facilitate browning a food surface.

The combination convection/microwave oven operates in three modes, namely, a microwave only mode, a convection cooking mode, and a combination cooking mode. In the microwave only mode, the microwave module is the only cooking module energized. Cooking is performed in the same way as known microwave ovens, with the microwave energy heating the food by exciting water molecules within the food.

In the convection cooking mode, only the convection module is energized. In convection cooking, two cooking schemes can be utilized. One cooking scheme is referred to as thermal emulation. With thermal emulation, the oven is pre-heated to a target temperature. Once the target temperature is reached, the user places the food into the cooking cavity and the food is cooked for the same amount of time as in a conventional thermal oven. For example, if the package directions for a food direct a user to cook at 350 degrees F. for 10 minutes, the oven is preheated until the cooking cavity temperature reaches 350 degrees. The food is then placed into the cavity for 10 minutes.

The halogen lamps are controlled as described above. Specifically, once the target temperature is reached, the halogen lamps are turned off. Since the halogen lamps have a fast response time, once deenergized, the air in the cooking cavity begins to cool. Therefore, although there is some temperature overshoot, e.g., the cavity temperature may reach a temperature higher than 350 degrees F. for some period of time, the cavity begins to cool and significant adverse effects from such overshoot are avoided. If the temperature in the cooking cavity falls below a tolerance temperature, e.g., 340 degrees F. for a 350 degree F. target temperature, then the lamps are once again energized. The cycling continues until the cook time expires.

Another cooking scheme is referred to as customized cooking. In customized cooking, food is placed in cooking cavity for the entire cooking cycle, including pre-heat. The temperature sensor senses the starting temperature of the cooking cavity and the micro computer determines the pre-heat time required to achieve the target temperature.

For example, pizza can be pre-programmed into the controller. The micro controller determines, e.g., from a lookup table of preprogrammed cooking times, that pizza cooks at 375 degrees for 12 minutes. The user puts the pizza in the cavity, selects pizza on the control, and presses start. Based on the sensed starting temperature, the micro controller calculates the pre-heat time and the amount of cooking that occurs during preheating, and increments or decrements the 12 minute cooking time accordingly.

In the combination cooking mode, both the microwave and convection modules are energized in an alternating arrangement. Specifically, due to power limitations (e.g., the power source for the oven may be a 120 V line), the modules are not both energized at the same time, and control sequences energization of each module. Preprogrammed cooking instructions are stored in the control for various foods.

While the invention has been described in terms of various specific embodiments, those skilled in the art will recognize that the invention can be practiced with modification within the spirit and scope of the claims.

What is claimed is:

1. An oven comprising:

a cooking cavity;

a convection module comprising at least one halogen lamp;

a convection fan for drawing air from said cooking cavity and blowing air over said halogen lamp and into said cavity; and a controller coupled to, and controlling energization of, said convection module and said fan in a custom cooking mode dependant upon a starting temperature of the cooking cavity and cooking energy output of said convection module in preheating said cooking cavity.

2. An oven in accordance with claim 1 wherein said convection module comprises four halogen lamps.

3. An oven in accordance with claim 1 wherein said controller operates said oven in a plurality of modes.

4. An oven in accordance with claim 1 further comprising an RF generation module for supplying microwave energy to said cooking cavity.

5. An oven in accordance with claim 4 wherein said controller operates said oven in a plurality of modes, at least one of said modes comprising a microwave only mode, a convection mode, and a combination mode.

6. An oven in accordance with claim 1 further comprising a temperature sensor in thermal communication with said cooking cavity.

7. An oven comprising:

a cooking cavity;

a plurality of modules for delivering energy into said cooking cavity, said energy comprising heat and microwave energy; and a control operatively connected to said modules for controlling delivery of energy to said cooking cavity, said control configured to operate said modules in a microwave cooking mode, a convection bake custom cooking mode wherein cooking time is incremented or decremented based upon an amount of cooking energy introduced into said cavity in a preheat operation, and a combination mode.

8. An oven in accordance with claim 7 wherein said plurality of modules comprise an RF generation module and a convection module.

9. An oven in accordance with claim 7 wherein RF generation module comprises a magnetron.

10. An oven in accordance with claim 7 wherein said convection module comprise at least one halogen lamp.

11. An oven in accordance with claim 7 wherein in said combination mode, said control is configured to energize said convection module and said RF generation module.

12. An oven in accordance with claim 7 wherein in said convection bake mode, said control is configured to energize said convection module.

13. A method for operating an oven including a microcomputer, an RF generation module and a convection module for delivering cooking energy into an oven cavity, said method comprising the steps of:

obtaining at least one input from a user indicative of whether the oven is to operate in a microwave mode, a convection bake mode, or a combination mode;

energizing the RF generation module and the convection module in accordance with the user input; and when the convection bake mode is selected, adjusting an energization time of the convention module based upon a starting temperature condition of the oven cavity and an amount of time to preheat the oven cavity, thereby accounting for cooking energy attributable to oven preheating.

14. A method in accordance with claim 13 wherein if the oven is to operate in the microwave mode, then the RF generation module is energized.

15. A method in accordance with claim 13 wherein if the oven is to operate in the convection/bake mode, then the convection module is energized.

16. A method in accordance with claim 13 wherein if the oven is to operate in the combination mode, then the RF generation module and the convection module are energized.

* * * * *